United States Patent

Tippmann et al.

[11] Patent Number: 5,699,784
[45] Date of Patent: Dec. 23, 1997

[54] INSULATIVE ADAPTOR FOR A STEAM TABLE PAN

[76] Inventors: Joseph R. Tippmann, HRC-33, Box 8419, Rapid City, S. Dak. 57701; Vincent P. Tippmann, 8605 N. River Rd., New Haven, Ind. 46774

[21] Appl. No.: 678,454

[22] Filed: Jul. 9, 1996

[51] Int. Cl.⁶ ........................................ F24B 9/00
[52] U.S. Cl. ................. 126/33; 126/211; 126/214 A
[58] Field of Search ................. 126/33, 211, 214 R, 126/214 A, 221, 39 B

[56] References Cited

U.S. PATENT DOCUMENTS

| | | | |
|---|---|---|---|
| 2,072,428 | 3/1937 | Parise | 126/33 |
| 2,817,744 | 12/1957 | Free | 126/33 X |
| 2,847,552 | 8/1958 | Gates | 126/33 X |
| 2,890,462 | 6/1959 | Ross | 126/214 X |
| 3,098,924 | 7/1963 | Satton et al. | 126/261 X |
| 4,541,407 | 9/1985 | Sommers et al. | 126/214 A X |
| 4,759,276 | 7/1988 | Segroves | 126/39 R |

*Primary Examiner*—Larry Jones
*Attorney, Agent, or Firm*—Joseph J. Baker, Esquire

[57] ABSTRACT

A tubular-shaped sleeve of insulative material is disclosed adapted to fit around and encase the sides of a pan of the type used in steam tables to limit the degree of heat reaching the sides of the pan from steam or water to thereby substantially reduce the susceptibility of the inside side surface of the pan to adherence of food product being heated in the pan.

4 Claims, 2 Drawing Sheets

INSULATIVE ADAPTOR FOR A STEAM TABLE PAN

FIELD OF THE INVENTION

This invention relates to pans for heating food products in steam tables and more specifically to an insulative adaptor therefore which encases the outer side surfaces of the pan to thereby permit heat from steam or water to reach only the bottom area of the pan to substantially reduce the adherence of food product to the inner sides of the pan.

BACKGROUND OF THE INVENTION

Steam tables are commonly used to warm pans containing food served in restaurants, institutions and the like. Water, heated electrically or by gas, is used in the wells of the tables to act as a heat transfer medium to the outer sides of the pans. These warmers are designed to hold pans of various sizes, shapes and depths, the most common large pan is 12"×20". Typically, these pans have a lip around the periphery of the open edge of the pan to support the pan in the well and limit the extent to which the pan extends into the well. During use of the aforedescribed pans, it was very common for food product to adhere to or encrust the inside surfaces of the pans as product was taken from the pans. This adherence of product to the inside surfaces of the pan as the level of food product in the pan is reduced during serving thereof is caused by the high degree of heat the outer surfaces of the pan continues to be subjected to from the water or steam. This adherence or encrustation of food is very unsightly and renders the appearance of the food unappetizing.

Further, covers or lids are normally provided which fit over the top of the pans to prevent the loss of heat and moisture from the food product contained therein. These covers or lids are unattached to the pans. Typically, when food product is to be served, the cover or lid is removed and, because it is unattached, it, more often than not, is placed on top of other lids or the table top itself. Frequently, food product adheres to the edge of the cover and is then transferred to surrounding surfaces when the cover is placed down. The general mess associated with the use of present day steam table pans and their covers as pointed out above is obviated by the device of the present invention.

In view of these and other deficiencies of the prior art steam table pans and their covers, it is one object of the invention to provide a sleeve which surrounds a portion of the pan extending from its open end down a distance on the sides thereof to thereby insulate that portion of the sides from the heated water or steam.

It is another object of the invention to provide hinge means on the sleeve for pivotably attaching a cover for the pan to preclude the necessity of it being removed during the serving of food and placed elsewhere.

It is a further object of the invention to provide a lip means on the sleeve to limit the travel of the pan into a recess in the steam table top.

These and other more detailed and specific objects of the present invention will be apparent in view of the following description setting forth by way of example but a few of the various forms of the invention that will be apparent to those skilled in the art once the principles described herein are understood.

SUMMARY OF THE INVENTION

In accordance with the present invention, a device is provided which effectively insulates a portion of the outer sides of a steam table pan to thereby prevent steam heat from reaching the outer sides thereby substantially eliminating the adherence of food on the inside surfaces of the pan opposite the device. The device basically comprises a sleeve having an internal shape which is substantially the same as the external shape of the pan sides and which, when in position, extends a distance from the open edge down toward the bottom of the pan. The bottom of the pan and, if desired, a portion of the sides of the pan adjacent to the bottom remain exposed to the water or steam heat when the sleeve is in position around the outside of the pan to thereby continually heat the remaining food product in the pan. The sleeve is provided with one or more spring loaded hinges for pivotably mounting a cover thereto to obviate the necessity of having to remove the cover and place it down elsewhere when food is to be served. In addition, a lip or flange is provided adjacent the open end of the pan to provide a support for the pan when in the steam table and to thereby determine the extent the pan extends below the steam table top.

THE FIGURES

DETAILED DESCRIPTION OF THE INVENTION

Figure 1:
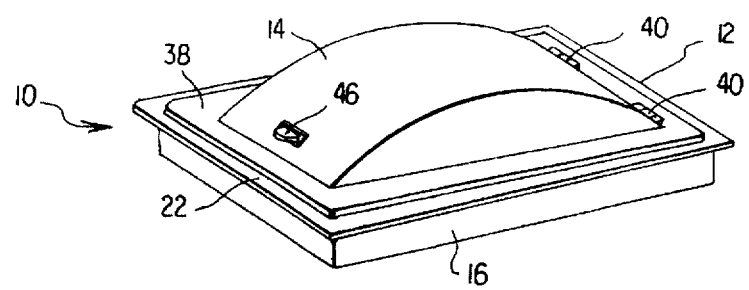
FIG. 1 is a perspective view of the insulative device with cover attached.
Figure 3:
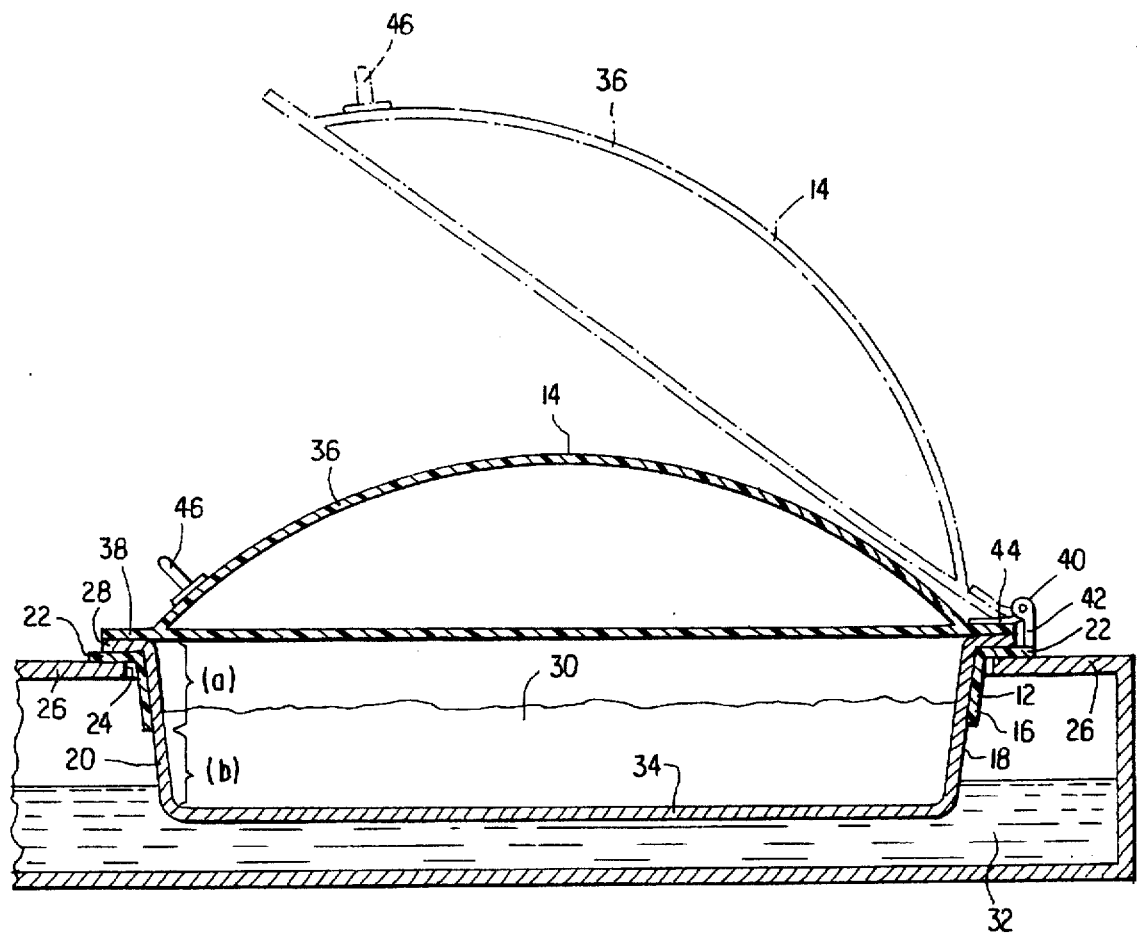
FIG. 3 is a transverse sectional view of the insulative device with a cover in the closed position.
Figure 2:
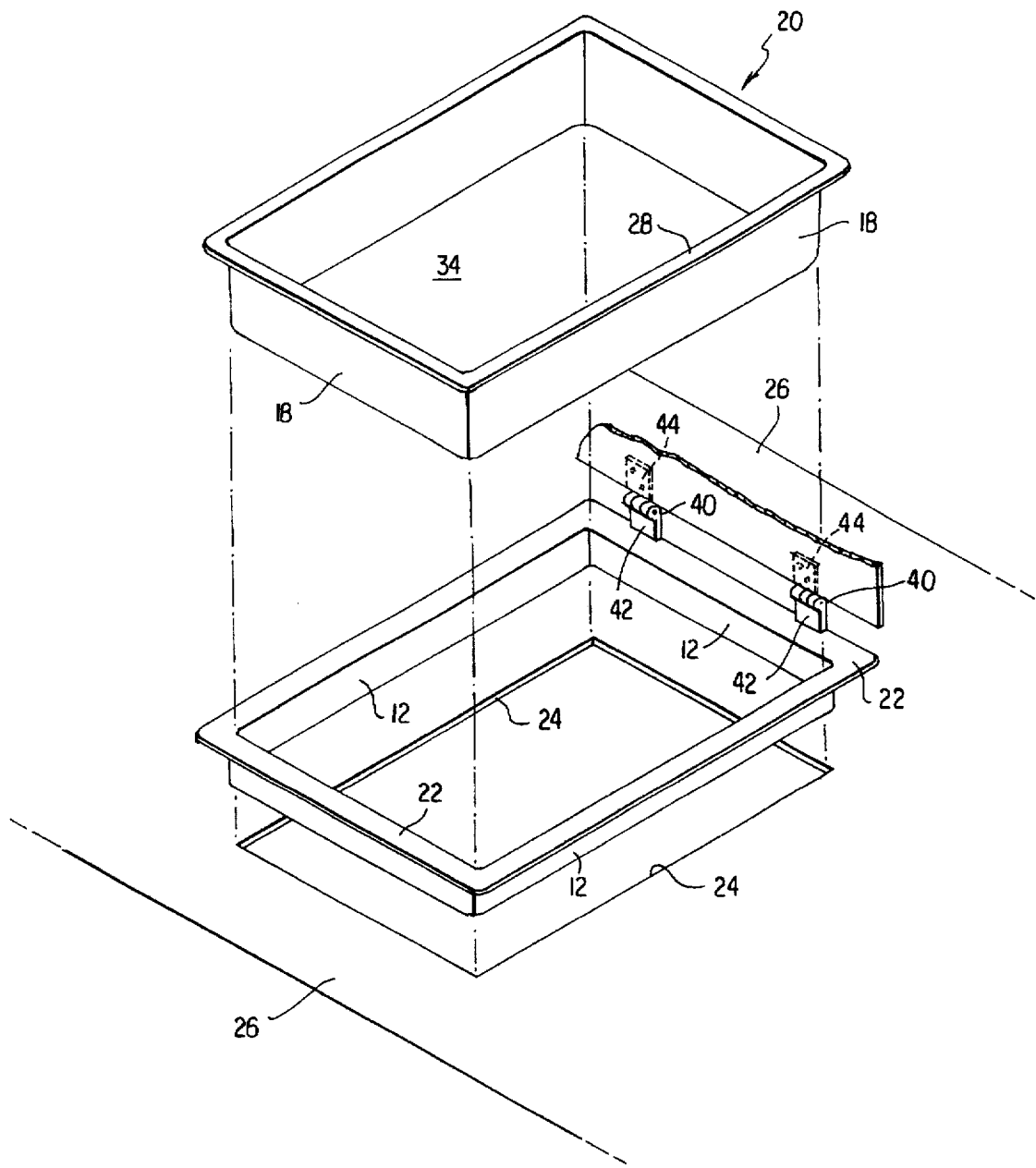
FIG. 2 is an exploded view of the insulative device.

Referring now to the drawings where similar characters of reference refer to similar elements in each of the several figures, 10 indicates generally in FIG. 1 the insulative device 12 of the prevent invention with attached cover 14. The device 12 has a continuous side 16 whose shape is similar to the external shape of the side 18 of the pan 20 so that when in position, as best seen in FIG. 3, the side 16 of the device 12 engages or is very close to the outside surface of side 18 of pan 20. The device 12 also has a flange portion 22 integrally formed with, and extending around, side 18. The width of the flange 22 is sufficient to overlap an opening 24 in a steam table top 26 and give support at the lip 28 of the pan 20. The distance the side 16 extends downward along the outside surface of side 18 depends on where adherence and encrustation normally begins for a specific type of food 30. However, for most foods, extending the side 16 downward a distance equal to approximately one-half the depth of the pan 20 would enable the food 30 to be heated properly by the steam or water 32 yet provide adequate insulation to the area (a) of the pan 20 to prevent adherence and encrustation of the food 30 normally caused by the same degree of heat entering area (a) that enters the bottom 34 of pan 20 and area (b) adjacent thereto. The insulative device 12 can be made of materials such as, for example, plastic, rubber, neoprene, etc.

The cover 14 is typically made of clear plastic-like material so that the type of food 30 being heated can be viewed. The cover 14 is normally of the bubble type and has a central portion 36 which enables condensation forming thereon to be returned to the pan 20. The cover 14 also has a flange portion 38 extending around the periphery of the central portion 36 which, when positioned on the pan 20, engages the lip 28 of the pan 20 to prevent air from entering. One or more hinges 40 which can be spring loaded are also provided having one leaf 42 attached to the flange 22 of the device 12 by heat, adhesive or the like or it could be integrally formed of the same plastic-like material forming the device 12. The other leaf 44 of the hinge 40 can be bolted to the flange portion 38 of the lid 14. A handle 46 can also be provided to enable the lid 14 to be pivoted up (shown in phantom in FIG. 3) on the hinge(s) 40 during food serving thus eliminating the necessity of finding a separate location therefore.

To assemble, the lid 14 is raised to its fully open position with respect to the insulative device 12, the pan 20 is inserted in the device 12 so that the flange portion 28 of the pan 20 engages the flange portion 22 of the device 12 and the insulative device 12 and pan 20 are then inserted into the aperture 24 of the steam table top 26.

Many variations of the present invention within the scope of the appended claims will be apparent to those skilled in the art once the principles described above are understood.

What is claimed is:

1. A device for thermally insulating a portion of the food contents of a pan supported in a base, said base having a source of heat therein for heating said pan, said device comprising: a tubular-shaped sleeve means of thermal insulative material adapted to fit around and encase a portion of the side surfaces of said pan to thereby insulate said encased portion of said pan from said source of heat in said base.

2. A device as set forth in claim 1 further comprising means on said sleeve for limiting the extent said sleeve means enters said steam table.

3. A device as set forth in claim 2 wherein said limiting means is a lip extending around the outer periphery of said sleeve for engaging the top of said steam table.

4. A device as set forth in claim 1 further comprising:

a) a lid for said pan, and b) hinge means on said sleeve for pivotably attaching said lid to said sleeve means.

* * * * *